Dec. 29, 1970  D. L. GOSPER ETAL  3,551,546
METHOD FOR THE PRODUCTION OF BIAXIALLY ORIENTED
POLYPROPYLENE FILM
Filed July 5, 1968  5 Sheets-Sheet 1

INVENTORS
Myron L. Moffitt
David L. Gosper

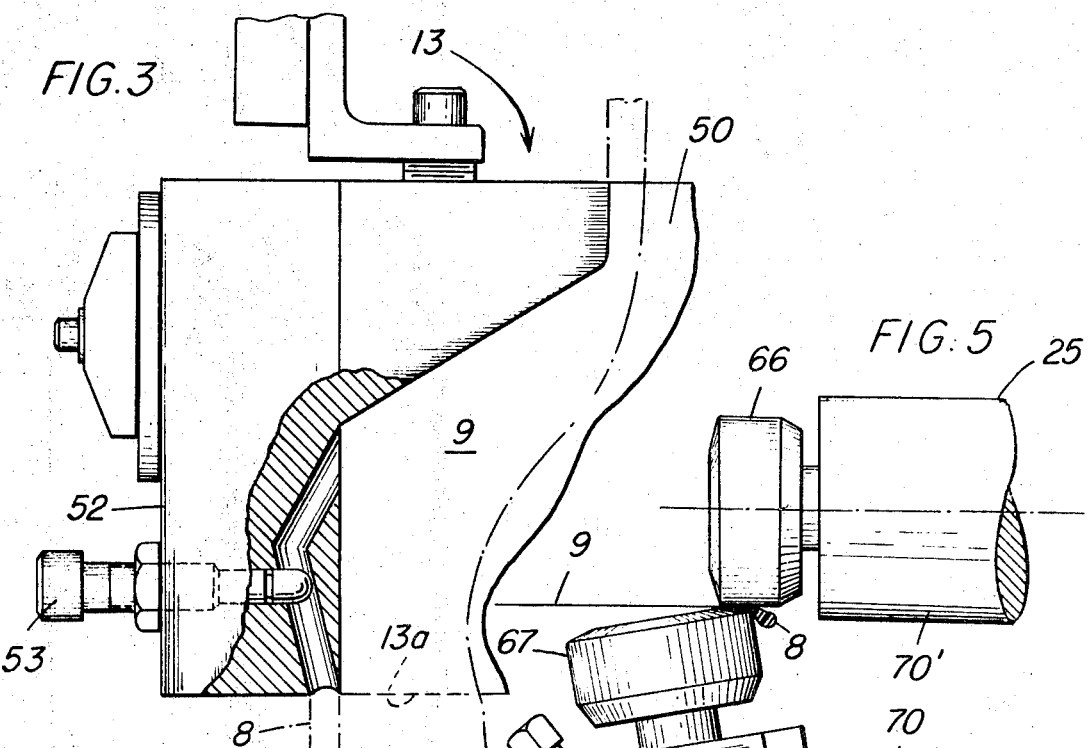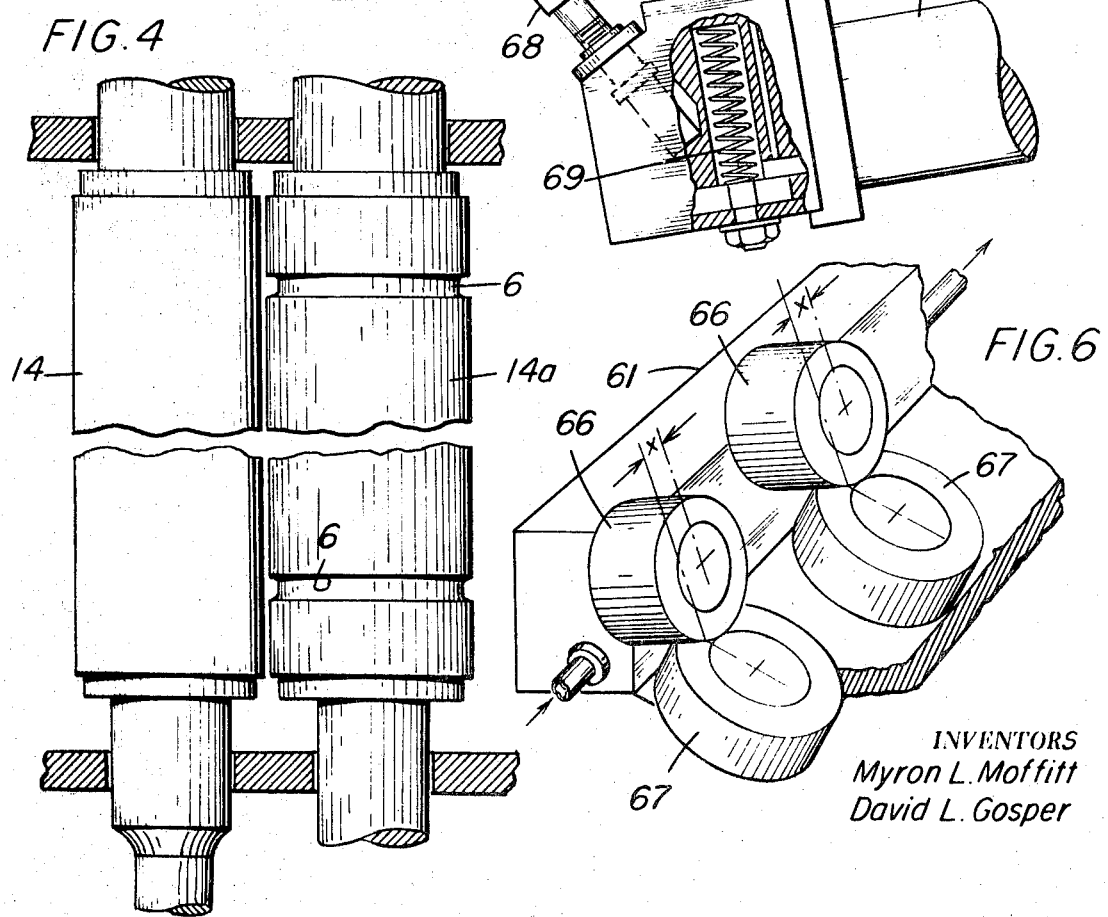

FIG. 7a
Base Film Cross Section Prior to Calendering
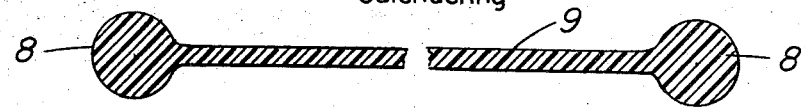
FIG. 7b
Base Film Cross Section After Calendering
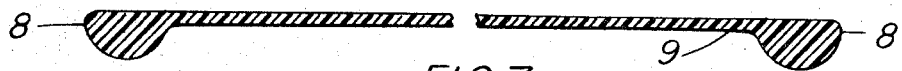
FIG. 7c
Base Film Cross Section After Transverse Direction Orientation
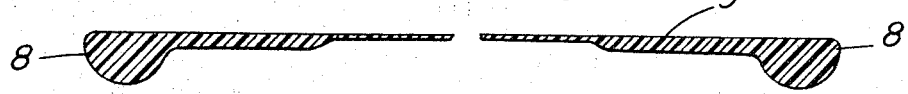
FIG. 7d
Cross Section of Biaxially Oriented Film After Machine Direction Orientation
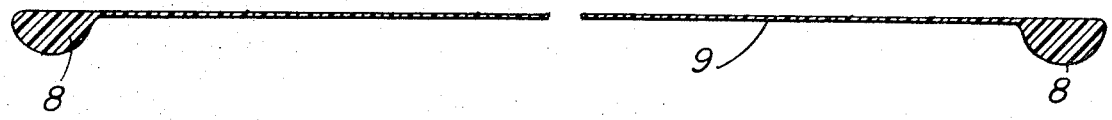
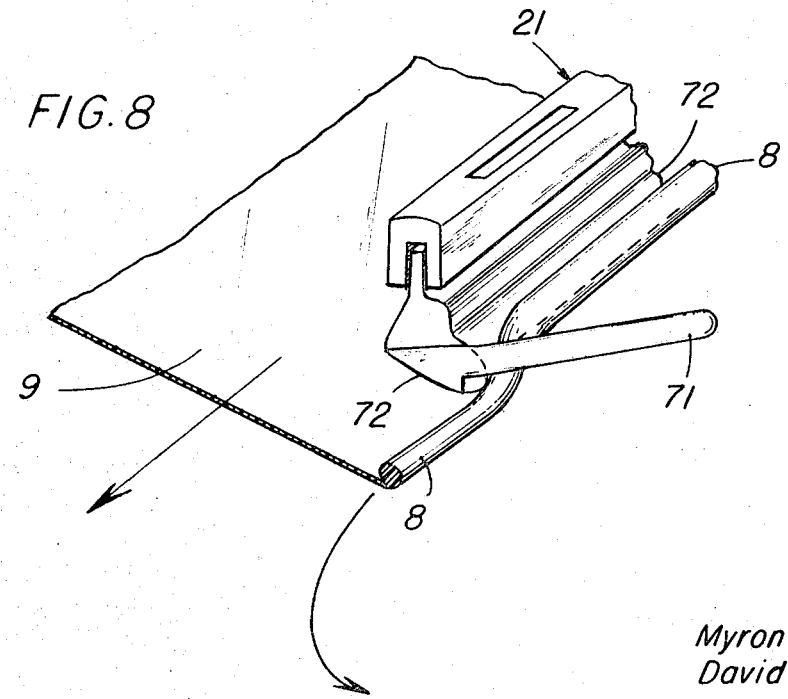
FIG. 8
*INVENTORS*
Myron L. Moffitt
David L. Gosper

United States Patent Office 3,551,546
Patented Dec. 29, 1970

3,551,546
METHOD FOR THE PRODUCTION OF BIAXIALLY ORIENTED POLYPROPYLENE FILM
David L. Gosper, Canandaigua, and Myron L. Moffitt, Fairport, N.Y., assignors to Mobil Oil Corporation, a corporation of New York
Filed July 5, 1968, Ser. No. 742,680
Int. Cl. B29d 7/24
U.S. Cl. 264—178
19 Claims

ABSTRACT OF THE DISCLOSURE

A continuous method for the high speed production of biaxially oriented polypropylene film having substantially uniform gage which comprises the steps, in sequence, of extruding a polypropylene melt through a flat film die into a spaced pair of rotating nip rollers; passage of the polypropylene through the nip rollers into a quench bath whereby a base film is formed; preheating the base film to an orientation temperature and thereafter stretching it in a transverse direction; and subsequently passing the transversely stretched film to a longitudinal direction orienter and therein stretching the film in a longitudinal direction. The biaxially oriented polypropylene film may subsequently be heat-set to impart thereto thermal stability.

BACKGROUND OF THE INVENTION

(I) Field of the invention

The present application is directed to a method for the high speed production of biaxially oriented polypropylene films by orientation of a quenched polypropylene base web employing the sequential steps of extrusion, quenching, preheating and stretching sequentially in bi-lateral directions under carefully controlled conditions of temperature, stretching ratios and stretching rates in order to achieve optimum film physical characteristics and particularly film which exhibits a substantially uniform gage, i.e. minimal gage variation in the transverse and longitudinal directions thereof.

(II) Description of the prior art

Numerous patents have been issued in the past relating to the art of improving the film physical characteristics of polypropylene by the stretching or orientation thereof. For example, U.S. Pat. No. 3,217,073 discloses a method for the production of biaxially oriented polypropylene film which comprises a sequence of process steps, including the extrusion of the molten polypropylene resin in the form of a film, quenching the extruded film, and thereafter sequentially stretching the film initially in the transverse direction, and subsequently in the longitudinal direction. It is noted that this patent discloses a method which requires the need for the employment of a descending temperature gradient while the film is being stretched in the transverse direction in order to achieve satisfactory film properties such as, for example, alleged high modulus and high clarity. Such process limitations are undesirable for high production speeds required for commercial operations, especially when it is recognized that the stretching or orientation process generates heat. To the extent that this generated heat may not be able to escape to the environment rapidly, the temperature of the film will rise. In general, the faster the rate of heat generation, i.e. the faster the rate of stretching, the more difficult it will be to provide for rapid dissipation of the heat via regulation of the environmental temperature and the greater will be the rise in the film temperature. An orientation method that requires maintenance of a descending temperature gradient during stretching must necessarily restrict itself to lower stretching rates than one, for example, which may employ isothermic temperature conditions during orientation. For stretching equipment of a given size, lower stretching rates are synonymous with lower production speeds.

U.S. Pat. No. 3,271,495 discloses a method for the orientation of polypropylene film utilizing the generic orientation steps as described in connection with U.S. Pat. No. 3,217,073 described hereinabove. It is noted that U.S. Pat. No. 3,271,495 teaches that, in order to obtain desirable physical properties in the final oriented polypropylene film product, the temperature of the quench bath into which the molten polypropylene resin is extruded should be maintained at from about −75° C. up to about 15° C. Higher quench temperatures are alleged, in this patent, to result in a highly crystalline film that is difficult to stretch uniformly. In contrast, applicants have found that extrudates can be quenched at substantially higher temperatures without adversely affecting the uniformity of stretching. In accord with the provisions of the present invention, the maximum allowable quench temperature is governed not by crystallinity but by the necessity to avoid localized boiling of the quenching medium as it contacts the extrudate, which would result in a marring of the base film. As more fully described hereinafter, the temperature profile which the base web is subjected to during the sequential preheat and orientation steps involved in the method of the present invention results in an easier and more extensive deformation of the more crystalline regions in the film. Accordingly, since the method of the present invention is less sensitive to higher levels of crystallinity in the quenched extrudate, extrusion speeds are not subject to as great a degree of limitation by heat transfer requirements during quenching.

SUMMARY OF THE INVENTION

In general, the present application is directed to a method for the production of biaxially oriented polypropylene film which comprises a sequence of process steps under carefully controlled conditions of temperature, stretch ratios and stretch rates whereby an oriented film product is produced which exhibits properties far superior to oriented film heretofore produced in accord with the prior art techniques previously discussed. In particular, the present invention provides a method for the production of biaxially oriented film which results in the oriented film product having extremely low gage variation, i.e. on the order of less than about 20% in both the transverse and longitudinal direction of the finished oriented film product while, at the same time, being produced at substantially high extrusion speeds. Multiple reasons exist for the desirability of uniform gage in such oriented film structures. For example, proper feeding and folding of the film during its use on commercial packaging equipment requires certain levels of film stiffness. Since the stiffness of an oriented film depends approximately on the third power of the thickness and on only the first power of the modulus of elasticity in tension, it is apparent that excessive thickness variations can destroy or seriously impair the stiffness advantage that a high modulus film such as biaxially oriented polypropylene should clearly be capable of providing. Secondly, when films of non-uniform thickness are wound into rolls and stored prior to use thereof, it is known that localized regions of stretching and distortion are formed which correspond to regions of non-uniform gage in the oriented films. When such a roll is subsequently unwound, the film is found to be no longer planar, but rather bowed in one fashion or another. Film that has been distorted in this manner can be used only with great difficulty, if at all, in subsequent operations such as coating, printing, laminating, and/or high speed overwrap packaging operations. The oriented film products of the present invention which exhibit relatively uniform gage characteristics substantially reduce or entirely eliminate such prior art deficiencies.

The orientation process of the present invention may be better understood by reference to the following sequential process steps:

(I) Extrusion and quench

Polypropylene resin is extruded in the form of a base web into a set of rotating, spaced, temperature controlled rollers and through said rollers into a liquid cooling medium or quench bath. The rollers may be partially submerged in a liquid cooling bath so that the extrudate emerges from the rollers directly into the liquid cooling medium, or the rollers may be positioned above the liquid cooling bath, in which case the extrudate emerges in air immediately prior to immersion in the quench bath.

(II) Preheat

Uniformly preheating the polypropylene base sheet to a temperature above about 290° F. and preferably to a temperature greater than 300° F. but below the temperature at which the base polypropylene sheet looses sufficient mechanical strength to withstand the stresses imparted during the subsequent transverse stretching step.

(III) Transverse orientation

Stretching the base polypropylene sheet widthwise at least 600% by gripping the film at each edge and increasing the distance between said edges as the film is moved in a longitudinal direction and, simultaneously, causing the temperature of the film to increase to a temperature less than the crystalline melting point thereof but greater than the temperature at which the base film was at when transverse direction orientation thereof is initiated. During stretching of the base sheet in the transverse or widthwise direction, the temperature of the film along the edges of the base sheet is regulated and maintained at a temperature at least below that of the intermediate web portion undergoing transverse direction stretch.

(IV) Longitudinal orientation

The transversely stretched film is subsequently stretched lengthwise at least 400% while restraining its edges to prevent spontaneous lateral contraction thereof. During the lengthwise stretching of the film, the temperature thereof is maintained at least above about 300° F. and preferably higher than 320° F. During longitudinal stretching, the beaded film edges are maintained at a temperature at least below that of the intermediate web portion undergoing longitudinal direction stretch.

(V) Annealing

The biaxially oriented polypropylene film may optionally be heat-set to impart the desired degree of dimensional stability at elevated temperatures by passage of the film through a heated oven maintained at a temperature of from about 290° F. to about 350° F. while the film is restrained in both the longitudinal and lateral directions thereof.

BRIEF DESCRIPTION OF THE DRAWINGS

FIG. 3 is an enlarged fragmentary view of a portion of die member 3 illustrated in FIG. 1.

FIG. 4 is an enlarged overhead view of nip roller pair 14 illustrated in FIG. 1.

FIG. 5 is an enlarged fragmentary view of a section of machine direction orienter wheels 25 illustrated in FIG. 1.

FIG. 6 is a schematic perspective view of a section of the machine direction orienter wheels illustrated in FIG. 5.

FIGS. 7a, b, c and d are schematic representations of a cross-section of base web 9 illustrated in FIG. 1 during various stages of the process of the present invention.

FIG. 8 is an enlarged fragmentary view of a portion of clip 21 in engagement with base web 9 during passage thereof through transverse orienter 20.

DESCRIPTION OF SPECIFIC EMBODIMENTS

Figure 1:
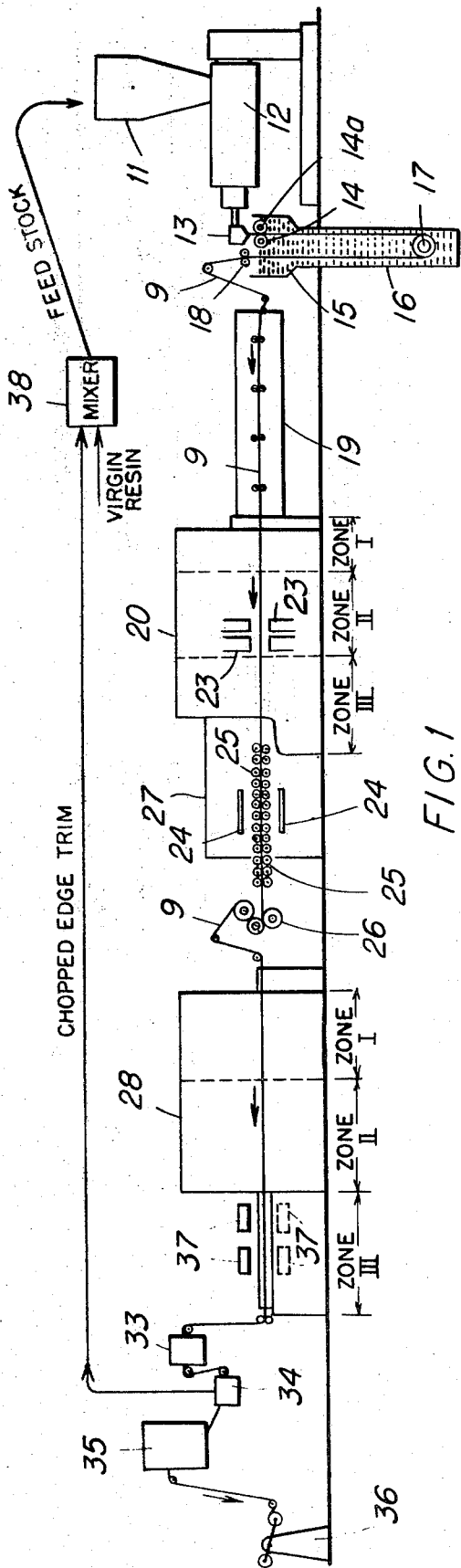
FIG. 1 is an illustration, largely schematic, of a side elevational view of an orientation line arrangement which may be employed in the process of the present invention.

As hereinbefore discussed, the orientation method of the present invention comprises the sequential steps of extrusion of a polypropylene melt; passage of the melt through a spaced set of calender rolls and into a quench bath; preheating the polypropylene base web to a suitable orientation temperature; stretching the base sheet initially in the transverse direction and subsequently in the machine direction; and optionally heat-setting the film to impart thermal stability thereto. Applicants have found that careful control of orientation conditions, and particularly precise control, within hereinafter defined limits, of the thermal history of the polypropylene base web as it undergoes orientation, results in a product, which, in addition to the inherent desirable physical properties of oriented polypropylene film heretofore available, exhibits a greater uniformity of thickness than such prior oriented products. More importantly, the method of the present invention allows production of such biaxially oriented films having greater thickness uniformity at commercially desirable production rates.

A particular feature of the method of the present invention is the temperature conditions which are imposed upon the film subsequent to quenching and prior to longitudinal stretching thereof. If the temperature, to which the base sheet is heated in the preheat step prior to transverse direction orientation thereof is too low, cold drawing occurs during transverse stretching resulting in a final product which exhibits a non-uniform gage, as well as detracting from other final film physical properties.

It has also been found that if the film temperature during transverse direction orientation thereof is maintained constant, i.e. film stretching under isothermal conditions, localized regions of non-uniform drawing normally occur in the film being stretched, which regions originate adjacent to the edge gripping mechanism employed and extend for a substantial distance across the width of the film. Such non-uniform drawing results in an excessively variable gage in the final oriented product. Also, it has been found that if the temperature profile of the film during transverse stretching is not regulated in accordance with the provisions of the present invention, the transversely stretched film is prone to splitting during the subsequent longitudinal stretching step. Applicants have also discovered that if, during transverse stretching of the polypropylene base web, an ascending film temperature gradient is maintained, as more fully described hereinafter, the resultant oriented film product exhibits a high degree of gage uniformity.

As more fully discussed hereinafter, applicants have additionally found that regulation of the temperature of the gripping and restraining mechanisms, employed in both the transverse and longitudinal direction stretching at temperatures below the temperature to which the intermediate web portions are exposed during transverse and longitudinal stretching, results in increasing the uniformity of draw near the film edges.

In still another aspect of the present invention applicants have found that, in a sequential process wherein film is oriented first in the tarnsverse direction and subsequently in the longitudinal direction, there are certain desirable minimal ratios by which the film should be stretched in the longitudinal direction. Insufficient stretching in the longitudinal direction results in poor gage uniformity when measured in the longitudinal direction. Applicants have found that, generally, as the extent of longitudinal stretching is increased, the uniformity of film thickness improves. In the production of oriented films, it is desirable for many end uses to provide a film having essentially equal mechanical properties in all directions. Such balancing of properties is dependent upon the relationship between the relative extents of stretching of the film in the transverse and in the longitudinal directions thereof. It will be apparent, therefore that the extent to which it is desirable to stretch in the longiudinal direction is dependent not only on final gage uniformity in the oriented product but additionally on the extent to which the film had been previously stretched in the transverse direction. Applicants have found, in accord with one particular aspect of the present invention, that a particularly favorable combination of thickness uniformity and balance of mechanical propreties of the transverse and longitudinal direction may be obtained when the film is stretched from about 800 to about 900% in the transverse direction and from about 500 to about 650% in the longitudinal direction.

A better understanding of the method of the present invention may be had by reference to the accompanying drawings wherein, as illustrated in FIG. 1, polypropylene feed stock is fed through feed hopper 11 into a standard rotating screw extruder 12. In extruder 12, the polypropylene resin is melted and continuously forwarded by internal rotating extruder screw (not shown) to the extruder exit and through die 13 located at the exit end of extruder 12. Die orifice 13a, as more clearly illustrated in FIG. 3, regulates the flow of molten polymer through orifice 13a as more fully described hereinafter whereby the polypropylene base web which emerges from the outlet orifice of such a die is characterized by having continuous edge beads or enlarged portions running along the opposite longitudinal edges thereof. As the base web 9 emerges from the die orifice 13a, it is passed into the nip formed by a pair of counterrotating rollers 14. Counterrotating rollers 14 are partially submerged in water bath 15 contained in quench tank 16, whereby when the base web emerges from the nip of rollers 14, it enters directly into water bath 15 which serves to solidify the molten or semi-molten polypropylene web 9. As more clearly illustrated in FIG. 4, nip roller 14a is provided with a pair of circumferentially extending recesses or grooves on the surface thereof. These grooves serve to accommodate the edge bead along the longitudinal edges of the base web 9 and to more definitely define such beads before the web submerges into quench tank 16. The now substantially solidified base web passes around roller 17 located near the bottom of quench tank 16 and is passed up out of the water bath through sets of guide rollers 18 and into preheat tunnel 19 wherein the polypropylene base web is preheated prior to passing through the subsequent orientation operations. Immediately upon emergence from preheat tunnel 19, the preheated base web is passed into a transverse direction orientation zone, generally identified as 20 in FIG. 1, which comprises a modified textile-type tenter frame which is subdivided into three contiguous zones internally thereof. As more clearly illustarted in FIG. 2, the beaded longitudinal edge portions of polypropylene base web 9, upon entry into Zone I of the transverse direction orienter, are gripped by a series of edge bead retaining clips 21 which are carried on a pair of sapced-apart, continuously moving endless chains 22. In Zone I, no substantial stretching of the base web occurs. In Zone II, the chain pair 22 carrying the edge bead engaging clips 21 diverge outwardly whereby the polypropylene base web is stretched, at elevated orientation temperatures, in the transverse direction. As the transversely stretched polypropylene is carried into Zone III of transverse direction orienter, the path of travel of the edge bead engaging clips 21 again becomes substantially parallel whereby no substantial stretching of film occurs in Zone III of the orienter. Zone III of transverse orienter 20 is, in effect, a preheat section for the base web before it subsequently undergoes machine direction orientation. Immediately upon exit from the transverse direction orienter 20, the edge bead retaining clips release the polypropylene film and allow it to pass into the machine direction orienter 27. Machine direction orienter 27 comprises an enclosed oven which has banks of radiant heaters 24 positioned above and below the film as it passes therethrough. Machine direction orienter 27 is further characterized by having two longitudinally extending series of pairs of machine direction orientation wheels 25 which serve to engage the edge beads of the transversely stretched polypropylene film during the machine direction stretching or orientation thereof in order to prevent necking down, i.e. transverse direction shrinkage, of the film as it is being stretched in the longitudinal direction. As illustrated in FIG. 1, machine direction orientation is achieved by passing the already transversely stretched film through the machine direction orienter and into a set of nip rollers 26 which are rotated at a speed which is higher than the entry rate of the film into the machine direction orienter, thereby longitudinally stretching, at orientation temperatures, the transversely oriented web. The resultant film is now biaxially oriented. Optionally, in order to improve the thermal stability of the novel biaxially oriented polypropylene film, such film may be passed through annealer 28, as more fully described hereinafter.

Subsequent to the optional annealing step, the biaxially oriented film, as illustrated in FIG. 1 may be passed through a series of finishing steps including edge bead removal in trimmer 34; surface treatment in treater 35 to improve the receptivity of the oriented film surface to, for example, coatings and printing inks; and subsequently to windup station 36 where the oriented film may be wound into roll form.

As illustrated in FIG. 3, a fragmentary view partially in section of a portion of die 13 shown in FIG. 1, polypropylene melt is fed from extruder 12 into passageway 50 of the die. Die end plates 52 are provided with circular passageways 41 through which a portion of the polypropylene melt flowing through passageway 50 is diverted. Circular passageway 51 is provided with adjustable metering valve 53 to regulate the amount and flow velocity of polypropylene melt flowing through passageway 51. The diameter of circular passageway 51 is selected to provide the same average velocity of molten polymer as it emerges from circular passageway 51 at die orifice 13a as the velocity of polymer flow extruded from orifice 13a intermediate end plates 52. It has been found that when these extrusion velocities are uniform, the proportion of molten polymer extruded from circular orifice 51, to that through die orifice 13a intermediate end plates 52, will be the same as the proportions of material in the bead 8 to that in the web intermediate beads 8 as sized by the calender. Since the pressure drop in circular passageway 51 is less than that in the main portion of the die body, metering valve 53 is provided to regulate the flow rate through passageway 51.

As illustrated in FIG. 4, an overhead view of calender roll assembly 14, roller 14a is provided at opposite ends thereof with grooves 61 extending entirely around the periphery of roller 14a. As hereinbefore discussed, grooves 61 serve to accommodate the excess molten polymer material along the longitudinal edges of base polypropylene web 9 as it is emitted from die orifice 13a, thereby more distinctly defining longitudinal edge beads 8 as polypropylene web 9 is extruded into water bath 15 where it is solidified.

Figure 2:
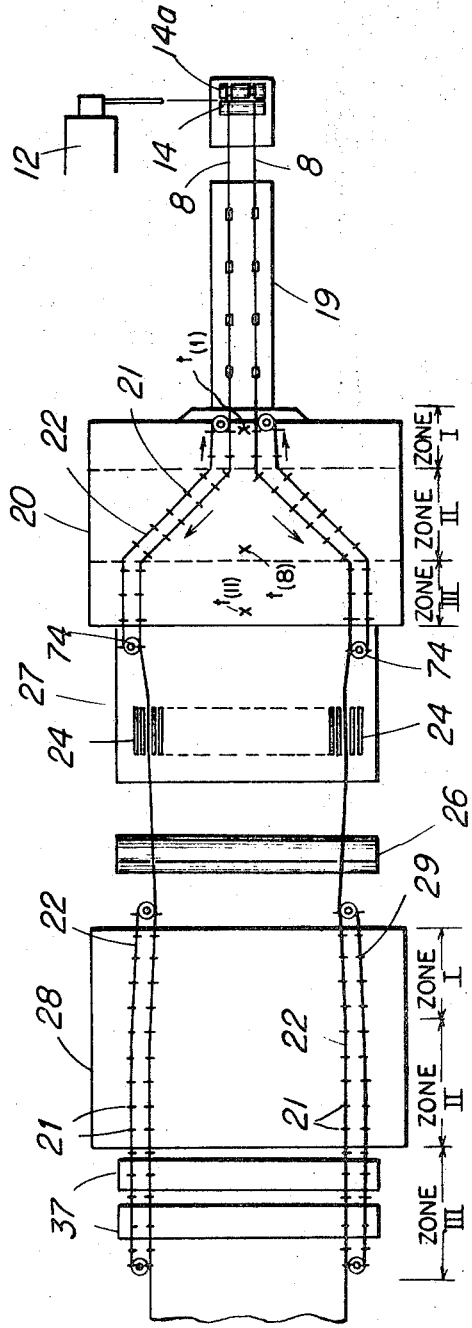
FIG. 2 is an overhead view, largely diagrammatic, of the schematic line compoennts illustrated in FIG. 1.
Figure 9A:
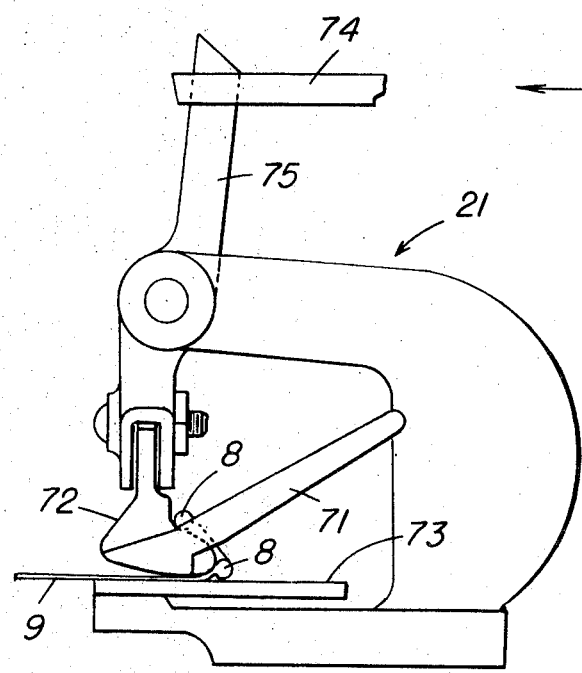
FIGS. 9a and 9b are enlarged schematic illustrations of edge bead retaining clips 21.
Figure 9B:
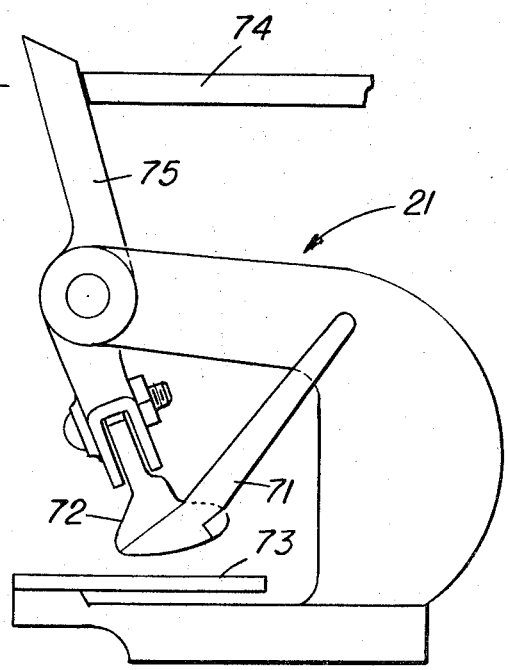

FIGS. 9a and 9b are enlarged schematic illustrations of edge bead retaining clips 21 indicated in FIG. 1. As illustrated in FIG. 9a, clip 21 is provided along the leading edge thereof with upwardly extending arm 71, integrally joined to the rear of the leading edge of clip shoe member 72. Arm 71 functions to insure positive release of the edge bead from the clip 21 as the clips 21 are opened at the terminal end of the orienter 20 and rerouted on their continuous chain mounting 22 around wheel 74 back to the beginning of Zone I in orienter 20 as illustrated in FIG. 2. As more clearly illustrated in FIG. 8, edge bead 8, as a result of the thermal history encountered during passage thereof through orienter 20, has a tendency to curl up around the upper edge of the inside of shoe portion 72 of clip 21 when clip 21 is in a film engaging closed position. Upwardly extending arm 71 functions to provide a positive stripping action of edge bead 8 from upper shoe portion 72 of clip 21 as clip 21 is opened and carried away from edge bead 8, thereby insuring positive separation of clip 21 from transversely stretched base web 9 at the terminal end of transverse orienter 20. FIG. 9b illustrates the open position of clip 21 subsequent to its disengagement from edge bead 8.

Figure 10A:
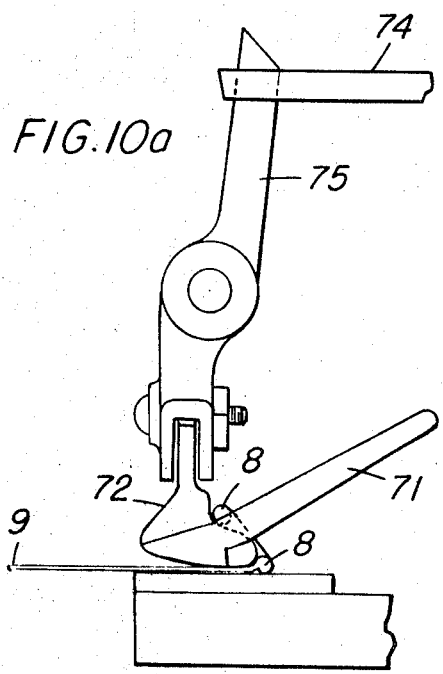
FIGS. 10a and 10b are enlarged fragmentary views of portions of clips 21, illustrated in FIGS. 9a and 9b.
Figure 10B:
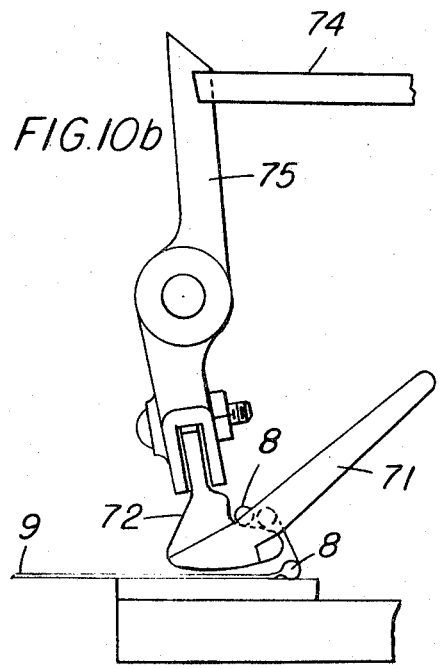

As illustrated in FIG. 10a, clip 21, only a portion thereof being shown for the sake of clarity, is in closed position immediately prior to opening thereof for disengagement from bead 8 on base web 9. Arm 71 continually holds a part of edge bead 8 in a relatively horizontal position throughout its passage through orienter 20, the curling action of bead 8 around shoe 72 occurring at a point behind arm 71. As the clip begins to open, FIG. 10b, by virtue of an outwardly applied force provided by wheel 74 to the upper inner surface of clip shank member 75, the curled around portion of edge bead 8 immediately behind arm 71 is positively stripped from clip shoe 72 by virtue of the continuous forward movement of base web 9 upon exit from transverse orienter 20, and the stripping action exerted on the curled up portion of edge bead 8 by arm 71. Applicants have found that without the aforedescribed clip arrangement, the curling action of edge bead 8 around clip shoe 72 will generally result in undesirable entanglement of the base web with clips 21 when attempts are made to open the clips for release of the continually advancing base web 9 at the terminal end of transverse orienter 20.

Figure 11:
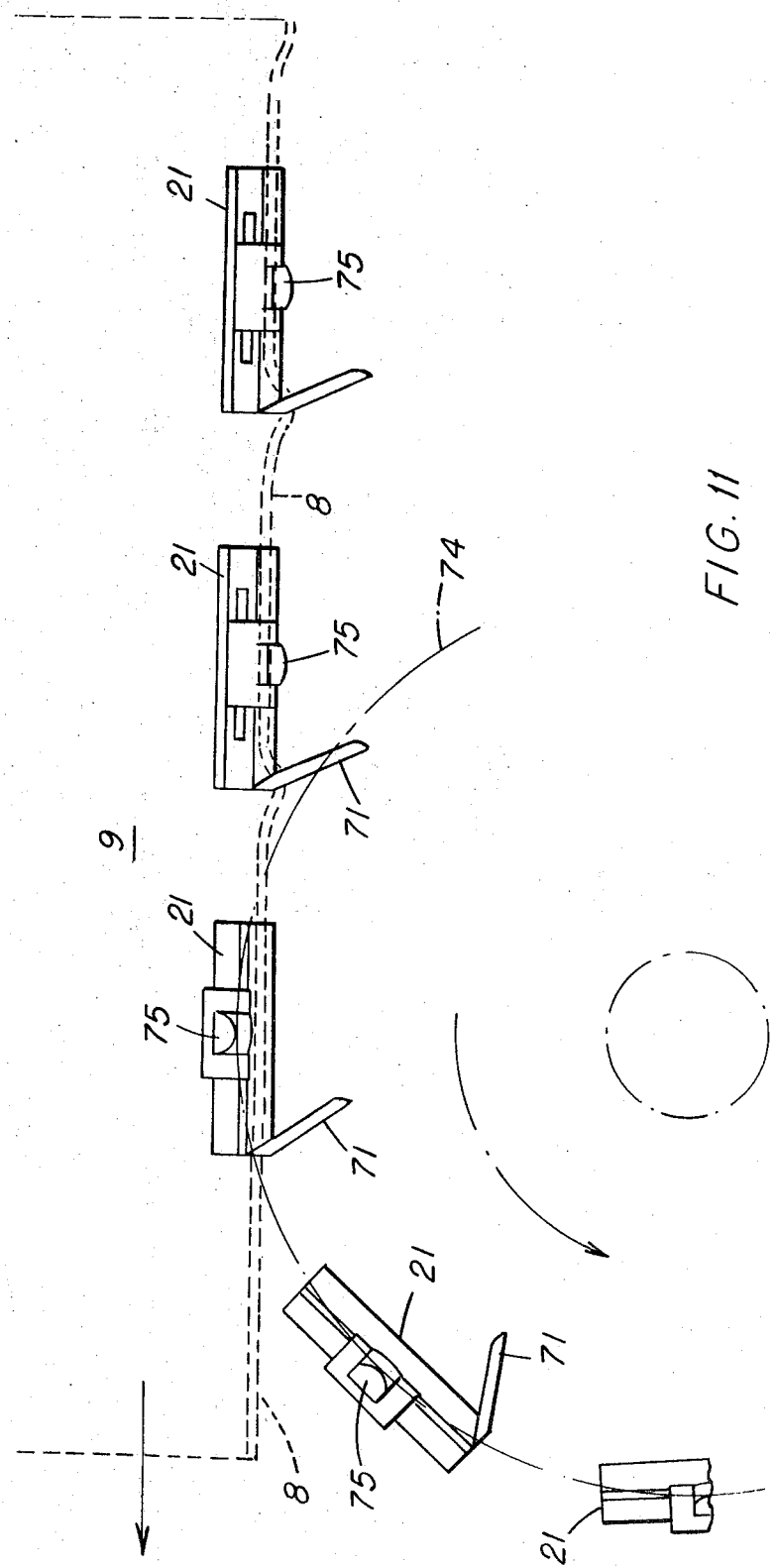
FIG. 11 is a schematic representation of an overhead view of clips 21 as they exit from transverse orienter 20.

FIG. 11 is an overhead view of a series of clips 21 as they are being opened by engagement with rotating wheel 74 and are being rerouted on continuous chain 22 to the beginning of Zone I in transverse orienter 20.

In order to maintain the temperature of edge bead portion 8 below the orientation temperatures which base web 9, intermediate edge beads 8, is exposed to during the transverse direction orientation, clips 21 may be cooled after they are opened at the exit end of orienter 20 by sprinkling base plate member 73 of clip assembly 21 with a suitable liquid (e.g. water) and immediately thereafter causing upper shoe portion 27 of clip 21 to be closed, thereby avoiding premature evaporation of the liquid sprayed on base plate 72 during passage of the clips 21 back through transverse orienter 20 to the beginning of Zone I in orienter 20, whereat the cooled clips 21 are again opened to engage longitudinal edge beads 8 of base web 9 as it emerges from preheater 19 into Zone I of transverse orienter 20.

As hereinbefore indicated, FIG. 5 is a schematic illustration of a single pair of machine direction orienter wheels 25, partially in section. Lower wheel 67 is mounted on spring 69 to insure a controllable gripping action on base web 9 in the nip formed with upper roller 66. Rollers 66 and 67 rotate freely around mounting shafts 70 and 70' on internal bearing races (not shown). Roll clearance is adjusted by screw 68 thereby controlling nip pressure applied to the longitudinal edges of base web 9.

As more clearly illustrated in FIG. 6, shafts 70 and 70' are mounted on longitudinally extending hollow block members 61, through which is circulated a suitable heat exchange fluid, oil for example, to cool, by conduction, orienter wheel pairs 25, thereby insuring that the longitudinal edge bead portions 8 of base web 9 are maintained at a temperature at least below the machine direction orientation temperatures to which the major portion of base web 9, intermediate edge beads 8, is subjected to during machine direction stretching thereof.

As also shown schematically in FIG. 6, the longitudinal axis of lower wheel 67 is positioned slightly in advance of the longitudinal axis of upper wheel 66. Applicants have found that this offset positioning of the longitudinal axis of wheel pair 25 insures the positive threading and proper positioning of edge bead 8 as it passes through the successive spacings S intermediate machine direction orienter wheel pairs 25. In the absence of such an offset alignment of the axes of wheels 66 and 67, there is a tendency for the edge portions of web 9 to "neck in" at spacings S intermediate wheel pairs 25, making proper thread-up of edge bead 8 from one roller pair 25 into the nip of the succeeding roller pair 25 extremely difficult, if not impossible.

The following examples, Examples 1, 2, 3 and 4, are intended to illustrate specific embodiments of the process of the present invention and advantages which are derived therefrom. Examples 5, 6 and 7 are directed to oriented film which was stretched only in the transverse direction and are representative of the utilization of process conditions which are departures from the method of the present invention. Attempts to longitudinally stretch the transversely oriented film material, produced in Examples 5 and 6, resulted in splitting of the film during the longitudinal stretching step.

EXAMPLE 1

Forty-eight percent by weight, baset upon the total weight of feedstock of virgin polypropylene resin pellets, identified by the manufacturer as Eastman Tentite 423–DF, and having the following properties:

| | |
|---|---|
| Melt index | 4.5 |
| Crystalline melting point, ° F. | 330 |
| Inherent viscosity | 1.4–1.6 |
| Molecular weight | 100,000–120,000 |
| Density, grams/cc. | 0.902 |
| Vicat softening point, ° F. | 293 | were admixed in mixer 38, illustrated in FIG. 1, with fifty-two percent by weight of chopped polypropylene edge bead trim recycle material and fed through resin feed hopper 11 and into extruder 12. Extruder 12 was a standard 6 inch extruder with a 20/1 length to diameter ratio. The barrel temperature of extruder 12 was maintained, adjacent the feed zone thereof, at 440° F. The temperature of the barrel of extruder 12 at a point immediately adjacent die 13 was approximately 450° F. The extruder head pressure was maintained at about 2200 p.s.i. and the screw speed of the extruder was 35 r.p.m. The temperature of the polypropylene melt as it was extruded through die orifice 13a was approximately 440° F. Upon emerging from the die orifice, the polypropylene base web passed into the nip formed by counterrotating rollers 14. Die orifice 13 was positioned a distance of approximately 3.375 inches from the nip formed by rollers 14. Rollers 14 were spaced approximately 38 mils apart and were rotated at a speed of approximately 30 feet per minute. As shown in FIG. 1, rollers 14 were immersed halfway, i.e. up to a point approximately at the center of their axis of rotation, in water bath 15. The base polypropylene web was calendered to a thickness of approximately 38 mils after passage through rollers 14 and emerged from the nip of rollers 14 at a point below the water level of water bath 15. Roller 14a was provided with a pair of circumferentially extending recesses on the surface thereof which accommodated the edge beads along the longitudinal edges of the base web and served to more definitely define such beads as illustrated in FIG. 7b before the base polypropylene web was submerged in quench tank 16. The temperature of water bath 15 contained in quench tank 16 was approximately 59° F. The quenched extruded base web was fed around roller 17 located near the bottom of quench tank 16, through guide rollers 18, and into preheat tunnel 19. The temperature within the preheat tunnel, as measured in the center of the tunnel about 2 inches above the base web travelling therethrough, was approximately 435° F. The temperature of the preheated polypropylene base web as it emerged from the exit end of preheat tunnel 19, and prior to entry thereof into transverse direction orienter 20, was approximately 308° F. As the base polypropylene web entered Zone I of transverse orienter 20, the longitudinal edge beads thereon were grasped by clips 21. Film temperature measurements of the polypropylene base web were continuously taken during the transverse direction orientation thereof. The temperature measurements were taken at positions corresponding to points $t_1$ through $t_{11}$ as illustrated in FIG. 2 of the attached drawings. These temperatures were recorded as follows:

| | | |
|---|---|---|
| One-third through Zone I of TDO* | 327 | ($t_1$) |
| Two-thirds through Zone I of TDO | 324 | ($t_2$) |
| Near end of Zone I in TDO | 319 | ($t_3$) |
| Near beginning of Zone II in TDO | 309 | ($t_4$) |
| One-quarter through Zone II in TDO | 313 | ($t_5$) |
| Halfway through Zone II in TDO | 318 | ($t_6$) |
| Three-quarters through Zone II in TDO | 322 | ($t_7$) |
| Near end of Zone II in TDO | 326 | ($t_8$) |
| Near beginning of Zone III in TDO | 325 | ($t_9$) |
| Halfway through Zone III in TDO | 331 | ($t_{10}$) |
| Near end of Zone III in TDO | 338 | ($t_{11}$) |

*Transverse Direction Orienter (20).

Thus, in Zone II of Transverse Direction Orienter 20, the zone wherein transverse stretching of the polypropylene base web occurs, the temperature of the film was caused to continuously increase during stretching thereof from about 309° F. ($t_4$) up to about 326° F. ($t_8$). While passing through Zone II, the polypropylene base web 9 was stretched in the transverse direction 840% by virtue of the divergence of edge bead engaging clips 21. Upon emergence from the exit end of the transverse direction orienter, clips 21 released the beaded edges of the transversely stretched film prior to its entry into the machine direction orienter 27. Clips 21 were water cooled prior to the return thereof to the beginning to Zone I of transverse direction orienter 20. The film temperature was measured to be about 338° F. upon issuance from machine direction orienter 27. During machine direction orientation the film was heated by radiant heater banks 24 positioned above and below the film during its passage through machine direction orienter 27. During machine direction orientation, the beaded edges of the transversely drawn polypropylene film were retained by the parallel rows of machine direction orienter wheel pairs 25 mounted on internally cooled blocks 61 as illustrated in FIG. 6, thereby preventing necking in, i.e. shrinkage in the transverse direction, of the film during longitudinal direction stretching. Stretching of the film in the longitudinal direction was accomplished by nip roller assembly 26, positioned at the terminal end of orienter 27. Nip rollers 26 were rotated at a surface speed of approximately 190 feet per minute which constituted an incremental rate differential of about 4.83 times the entry rate of the transversely stretched polypropylene base web into machine direction orienter 27, thereby causing the film to be stretched in the longitudinal direction by a ratio of approximately 4.83:1 or 483%. The film speed upon exit from machine direction orienter nip roll assembly was about 190 feet/minute as compared to its entry rate into the machine direction orienter 28 of about 33 feet/minute.

Subsequent to passage of the biaxially oriented polypropylene film through machine direction orienter 27, the oriented film was passed through annealer 28 as illustrated in FIG. 2. Annealer 28 which was substantially a modified textile-type tenter frame comprised a pair of endless chains 30 which carried a series of bead engaging clips 29. As illustrated in FIG. 1, the annealer oven 28 was subdivided into 3 contiguous zones, i.e. annealer Zones I, II, and III. The temperature in Zone I of annealer 28 was maintained at approximately 344° F. by heated air circulating therein. The air temperature in Zone II of of annealer 28 was maintained at approximately 297° F. Zone III of annealer 28 was not heated and functioned as a cooling zone, cool air being circulated through plenums 37 onto the surface of the biaxially oriented polypropylene passing therethrough. As more clearly illustrated in FIG. 2 of the attached drawings, as the beaded longitudinal edges of the biaxially oriented polypropylene web were engaged by clips 29 upon entry into Zone I of annealer oven 28, chains 30 carying clips 29 in Zone I diverged slightly in the transverse direction whereby the biaxially oriented polypropylene was stretched in the transverse direction approximately 7% during passage through Zone I of annealer 28. Since there was a tendency of the biaxially oriented polypropylene to neck down, i.e. shrink in a transverse direction upon emergence from machine direction orienter nip rolls 26, the 7% stretch of the film in Zone I of annealer 28 functioned to recover the loss in film width resulting from such neck down. In Zone II of annealer 28, clip carrying chains 30 assumed a substantially parallel path whereby no further transverse direction stretching of the film occurred. After passage through cooling Zone III of annealer 28, the oriented film was passed through a standard gage-monitoring device 33 which comprised a beta ray gage which continuously traversed across the oriented film to monitor and record any gage variations therein. Subsequently, as illustrated in FIG. 1, the edge beads were trimmed from the continuously advancing oriented film by a pair of a slitter knives (not shown) and the edge beads were then passed through a recycle operation for subsequent extrusion as base web material. The oriented film was next passed through treater 35 which consisted of a standard electronic treating device wherein the surface of the film was exposed to a corona discharge to enhance the receptivity thereof for subsequent printing and coating operations. Finally, the film was passed on to a windup stand 36 as illustrated in FIG. 1.

The average gage of the biaxially oriented film produced in accord with Example 1 was 0.7 mil. The properties of the resultant biaxially oriented polypropylene film produced in accord with Example 1 are shown below in Table 1.

TABLE 1

| | Longitudinal | Widthwise |
|---|---|---|
| Tensile modulus of elasticity, p.s.i. | 419,000 | 340,000 |
| Tensile strength, p.s.i. | 20,900 | 20,600 |
| Elongation, percent | 68 | 112 |
| Maximum gage deviation, percent | ±16 | ±10 |

EXAMPLE 2

The orientation procedure of Example 1 was followed except that the water bath 15 temperature was maintained at 80° F. The properties of the resultant biaxially oriented film were substantially identical to the properties listed in Table 1 above with the exception that the maximum percentage gage deviation in both longitudinal and widthwise direction of the film was about ±15% in the machine direction and ±12% in the transverse direction.

EXAMPLE 3

The orientation procedure of Example 1 was followed except that the film was stretched 590% in the longitudinal direction. The maximum percentage variation gage, as measured in the longitudinal direction, was ±7%.

EXAMPLE 4

The orientation procedure of Example 1 was followed except that the film was not stretched in the longitudinal direction. The resultant transversely stretched film showed no evidence of non-uniform drawing when viewed between crossed polarizing plates. The maximum percentage gage variation was ±12%.

EXAMPLE 5

The orientation procedure of Example 4 was followed except that temperature of the edge bead gripping mechanisms was not controlled or moderated to maintain them at a temperature below the orientation temperatures of the web structure intermediate the beaded edges. Severe non-uniform drawing was observed with crossed polarizers at the edges of the film and extending for a substantial distance inward toward the center of the film. The maximum percentage gage variation was ±29%.

EXAMPLE 6

The orientation procedure of Example 4 was followed except that the air temperature at the end of transverse direction stretching Zone II ($t_8$) was maintained at about 300° F. Pronounced regions of non-uniform drawing were observed by cross polarizers at the edges of the film and extending to substantial distances inwardly toward the center of the film.

EXAMPLE 7

The orientation procedure of Example 1 was followed except that the film was not laterally restrained by machine direction orienter wheels 25 during the longitudinal stretching reduction in width, and was distorted to such a degree as to be unusable as a packaging film.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A continuous method for the high speed production of substantially uniform gage, biaxially oriented, polypropylene film which comprises the steps, in sequence, of
   (a) extruding a molten polypropylene base film through the nip formed by a pair of spaced apart, counterrotating calendar rollers and then through a quench bath;
   (b) passing said base film from said quench bath into a preheat zone and heating said base film to a temperature of at least about 290° F. but below the melting point of said base film;
   (c) stretching said preheated base film in a transverse direction while (1) continuously increasing the temperature of said film as it is being stretched in the transverse direction within a temperature range of from about 290° F. to about 330° F., while (2) simultaneously maintaining the longitudinal edge portions of said film at a temperature below that of said intermediate film portion; and
   (d) thereafter longitudinally stretching said film in a longitudinal stretching zone to provide a biaxially oriented polypropylene film.

2. A method in accordance with claim 1 wherein, as said film is being stretched in said longitudinal direction, the longitudinal edge portions of said film are simultaneously maintained at a temperature below that of said intermediate film portion.

3. A method in accordance with claim 1 wherein said base film is stretched at least 800% during transverse orientation thereof.

4. A method in accordance with claim 1 wherein said film is stretched in a longitudinal direction at least 500% during longitudinal orientation thereof.

5. A method in accordance with claim 1 wherein the longitudinal edges of said film are restrained against transverse direction shrinkage during the longitudinal stretching of said film.

6. A method in accordance with claim 5 which comprises, while said film is advancing through said longitudinal stretch zone, restraining the longitudinal edges of said film, to avoid transverse direction shrinkage thereof, said restraining being carried out at spaced-apart longitudinally arranged series of restraining zones in a manner such that the longitudinal edges of the film, while passing through each of said restraining zones, are forced outwardly from the longitudinal axis of said film, whereby the thus outwardly forced intermittent portions are positioned for passage into the succeeding restraining zone in said series.

7. A method, as described in claim 1, wherein the extruded base film has a longitudinal bead edge portion on each of the longitudinal margins of said film; restraining the longitudinal edge bead portions of said film during the transverse stretch step and substantially abruptly releasing the film prior to longitudinal stretching thereof.

8. A continuous method for the high speed production of substantially uniform gage, biaxially oriented polypropylene film which comprises the steps, in sequence, of
   (a) extruding a molten polypropylene base film, having a continuous enlarged bead portion along each of the longitudinal edges thereof, through the nip formed by a pair of counterrotating and spaced-apart calender rollers and then through a quench bath;
   (b) passing the resulting quenched base film from said quench bath into a preheat zone and heating said base film to a temperature of at least about 290° F. but below the melting point of said base web;
   (c) stretching said base film in a transverse direction at least 800% while (1) continuously increasing the temperature of said film as it is being stretched in the transverse direction within a temperature range of from about 290° F. to about 330° F., while (2) simultaneously maintaining the beaded edge portions of said film at a temperature below that of said intermediate film portion; and
   (d) thereafter stretching said film in a longitudinal direction stretching zone at least 50% in a longitudinal direction and, simultaneously, while said film is advancing through said longitudinal direction stretching zone, restraining the longitudinal beaded edge portions of said film, to avoid transverse direction shrinkage thereof, at spaced-apart longitudinally arranged series of restraining zones in a manner such that the longitudinal edges of the film, while passing through each of said restraining zones, are forced outwardly from the longitudinal axis of said film, thereby the thus forced outwardly intermittent portions are positioned for passage into the succeeding restraining zone in said series.

9. A method in accordance with claim 8 wherein the longitudinal beaded edge portions of said film, during the longitudinal stretching thereof, are maintained at a temperature below that of said web portion intermediate the longitudinal beaded edge portions.

10. A method in accordance with claim 8 wherein said biaxially oriented film, subsequene to longitudinal direction stretching, is subjected to a temperature of from about 290° F. up to about 350° F. while the longitudinal beaded edges are restrained, whereby the resultant oriented film product is dimensionally stable when it is thereafter exposed to elevated temperatures.

11. A continuous method for the high speed production of substantially uniform gage biaxially oriented polypropylene film which comprises the steps, in sequence, of
   (a) extruding a molten polypropylene base film through the nip formed by a pair of spaced apart, counterrotating calender rollers and then through a quench bath;

(b) passing said base film from said quench bath into a preheat zone and heating said base film to a preheat temperature substantially below the melting point of said film;

(c) continuously increasing the temperature of said film as it is being stretched in the transverse direction within a temperature range of from about 290° F. to about 330° F.; and (d) thereafter stretching said film in a longitudinal direction to provide a biaxially oriented polypropylene film.

12. A method in accordance with claim 11 wherein, as said film is being stretched in said longitudinal direction, the longitudinal edge portions of said film are simultaneously maintained at a temperature below that of the film intermediate said edge portions.

13. A method in accordance with claim 11 wherein, as said film is being stretched transversely, maintaining that portion of said base film intermediate the longitudinal edges thereof at a temperature sufficiently high to provide a transversely oriented film while simultaneously maintaining the longitudinal edge portions of said film at a temperature below that of said intermediate film portion.

14. A method in accordance with claim 11 wherein said base film is stretched at least 800% during transverse orientation thereof.

15. A method in accordance with claim 11 wherein said film is stretched in a longitudinal direction at least 500% during longitudinal orientation thereof.

16. A continuous method for the high speed production of substantially uniform gage, biaxially oriented polypropylene film which comprises the steps, in sequence, of (a) extruding a molten polypropylene base film having a continuous enlarged bead portion along each of the longitudinal edges thereof, through the nip formed by a pair of counterrotating and spaced-apart calender rollers and then through a quench bath;

(b) passing the resulting quenched base film from said quench bath into a preheat zone and heating said base film to a temperature of at least about 290° F. but below the melting point of said base web;

(c) stretching said base film in a transverse direction at least 800% while (1) maintaining that portion of said base film intermediate the longitudinally extending beaded edge portions thereof at a temperature sufficiently high and within the range of from about 290° F. to about 330° F. to provide a transversely oriented film, the temperature of said film during the transverse orientation thereof continually increasing within a temperature range of from about 290° F. up to about 330° F. while (2) simultaneously maintaining the beaded edge portions of said film at a temperature below that of said intermediate film portion; and (d) thereafter stretching said film at least 500% in a longitudinal direction and, simultaneously, while said film is advancing through the zone of longitudinal stretching restraining the longitudinal beaded edge portions of said film, to avoid transverse direction shrinkage thereof, at spaced-apart longitudinally arranged series of restraining zones, in a manner such that the longitudinal edges of the film, while passing through each of said restraining zones, are forced outwardly from the longitudinal axis of said film, whereby the thus forced outwardly intermittent portions are positioned for passage into the succeeding restraining zone in said series.

17. A continuous method for the high speed production of substantially uniform gage, biaxially oriented, polypropylene film which comprises the steps, in sequence, of (a) extruding a molten polypropylene base film through the nip formed by a pair of spaced apart, counterrotating calender rollers and then through a quench bath;

(b) passing said base film from said quench bath into a preheat zone and heating said base film to a temperature of at least about 290° F. but below the melting point of said base film;

(c) stretching said preheated base film in a transverse direction while (1) maintaining that portion of said base film intermediate the longitudinal edges thereof at a temperature sufficiently high to provide a transversely oriented film while (2) simultaneously maintaining the longitudinal edge portions of said film at a temperature below that of said intermediate film portion, (3) continually increasing the temperature of such film while it is being stretched in the transverse direction within a temperature range of from about 290° F. to about 330° F.; and (d) thereafter longitudinally stretching said film in a longitudinal stretching zone to provide a biaxially oriented polypropylene film.

18. The method in accordance with claim 17 wherein the temperature of said film while it is being stretched in the transverse direction is increased from an initial temperature of about 290° F. up to a temperature of about 330° F.

19. The method in accordance with claim 17 wherein the temperature of said film while it is being stretched in the transverse direction is increased from an initial temperature of about 309° F. up to a temperature of about 326° F.

References Cited

UNITED STATES PATENTS

| | | | |
|---|---|---|---|
| 3,132,375 | 5/1964 | Koppehele | 264—289 |
| 3,146,284 | 8/1964 | Markwood, Jr. | 264—289 |
| 3,217,073 | 11/1965 | Olson et al. | 264—210 |
| 3,271,495 | 9/1966 | Gronholz et al. | 264—210 |
| 3,380,868 | 4/1968 | Moser | 264—289 |

ROBERT F. WHITE, Primary Examiner

G. AUVILLE, Assistant Examiner

U.S. Cl. X.R.

264—210, 289